US011241117B2

(12) United States Patent
Crocker et al.

(10) Patent No.: US 11,241,117 B2
(45) Date of Patent: Feb. 8, 2022

(54) INDUCTION-BASED HEAT RETENTIVE SERVER

(71) Applicant: Aladdin Temp-Rite LLC, Hendersonville, TN (US)

(72) Inventors: Rodger D Crocker, Hendersonville, TN (US); David R Gordon, Nashville, TN (US); R Kevin Ray, Gallatin, TN (US); Timothy D Altizer, Hendersonville, TN (US); Matthew J McCartney, Madison, TN (US); Martin A Rothschild, Hendersonville, TN (US); Phillip H Scruggs, Brentwood, TN (US)

(73) Assignee: Aladdin Temp-Rite LLC, Hendersonville, TN (US)

( * ) Notice: Subject to any disclaimer, the term of this patent is extended or adjusted under 35 U.S.C. 154(b) by 842 days.

(21) Appl. No.: 15/827,707

(22) Filed: Nov. 30, 2017

(65) Prior Publication Data
US 2018/0084950 A1 Mar. 29, 2018
US 2021/0401226 A9 Dec. 30, 2021

Related U.S. Application Data

(60) Continuation of application No. 13/934,509, filed on Jul. 3, 2013, now Pat. No. 9,854,942, which is a
(Continued)

(51) Int. Cl.
*A47J 39/02* (2006.01)
*A47J 36/24* (2006.01)
(Continued)

(52) U.S. Cl.
CPC .............. *A47J 39/02* (2013.01); *H05B 6/062* (2013.01); *H05B 6/105* (2013.01)

(58) Field of Classification Search
CPC .......... A47J 36/2494; A47J 36/02; H05B 6/12
(Continued)

(56) References Cited

U.S. PATENT DOCUMENTS 3,557,774 A  1/1971 Kreis
3,684,853 A * 8/1972 Welch .................... A47J 36/02
                                                          219/624

(Continued)

OTHER PUBLICATIONS

Anderson A.M., Carroll M.K. (2011) Hydrophobic Silica Aerogels: Review of Synthesis, Properties and Applications. Aerogels Handbook. Advances in Sol-Gel Derived Materials and Technologies. Springer, New York, NY. https://doi.org/10.1007/978-1-4419-7589-8_3 (Year: 2011).*

(Continued)

*Primary Examiner* — Dana Ross
*Assistant Examiner* — Lawrence H Samuels
(74) *Attorney, Agent, or Firm* — Womble Bond Dickinson (US) LLP

(57) ABSTRACT

A heat retentive server includes a chamber defined between an upper shell and a lower shell that are connected to one another. An induction-heatable member is positioned in the chamber, and the induction-heatable member may be heated by electromagnetic induction to a first temperature that is greater than the heat deflection temperature of the upper shell. Buffering material comprising an inhibitively conductive hydrophobic material is positioned in the chamber between the induction-heatable member and the upper shell, and the buffering material is adapted for providing predetermined conductive heat transfer from the induction-heatable member to the upper shell so that at least a portion of the upper shell is heated to a second temperature that is greater than the heat deflection temperature of the upper shell. The second temperature is less than the first temperature.

18 Claims, 3 Drawing Sheets

Related U.S. Application Data division of application No. 13/280,068, filed on Oct. 24, 2011, now abandoned.

(51) Int. Cl.
*H05B 6/12* (2006.01)
*H05B 6/06* (2006.01)
*H05B 6/10* (2006.01)

(58) Field of Classification Search
USPC ............... 219/620, 621, 622; 99/DIG. 14
See application file for complete search history.

(56) References Cited

U.S. PATENT DOCUMENTS

| | | | |
|---|---|---|---|
| 3,734,077 A | | 5/1973 | Murdough et al. |
| 3,916,872 A | | 11/1975 | Kreis et al. |
| 4,059,096 A | | 11/1977 | Schneider |
| 4,917,076 A | | 4/1990 | Nadolph |
| 4,982,722 A | | 1/1991 | Wyatt |
| 5,125,391 A | * | 6/1992 | Srivastava ............ A47G 19/027 126/246 |
| 5,603,858 A | | 2/1997 | Wyat et al. |
| 5,611,328 A | * | 3/1997 | McDermott ........ A47J 36/2494 126/246 |
| 5,750,962 A | | 5/1998 | Hyatt |
| 5,786,643 A | * | 7/1998 | Wyatt .................. A47J 39/006 126/390.1 |
| 5,901,699 A | * | 5/1999 | McDermott ........ A47J 36/2494 126/246 |
| 6,005,233 A | * | 12/1999 | Wyatt ................. A47J 36/2494 126/246 |
| 6,108,489 A | * | 8/2000 | Frohlich ............... A47J 47/145 392/346 |
| 6,150,636 A | * | 11/2000 | Bogdanski ............ A47J 27/002 219/443.1 |
| 6,188,053 B1 | | 2/2001 | Wyatt |
| 6,252,011 B1 | * | 6/2001 | Scott ...................... C08L 67/02 525/425 |
| 6,350,972 B1 | | 2/2002 | Wright |
| 6,444,961 B2 | | 9/2002 | Clothier et al. |
| 6,483,089 B1 | | 11/2002 | Wright et al. |
| 6,657,170 B2 | | 12/2003 | Clothier |
| 6,670,589 B2 | | 12/2003 | Wyatt |
| 6,822,204 B2 | | 11/2004 | Clothier |
| 7,067,773 B2 | | 6/2006 | DeWitt |
| 7,176,426 B2 | | 2/2007 | Ramirez |
| 8,269,155 B2 | * | 9/2012 | Welsh .................. B65D 77/225 126/246 |
| 8,302,528 B2 | | 11/2012 | Pawlick et al. |
| 8,357,882 B2 | | 1/2013 | Jones et al. |
| 2003/0116560 A1 | * | 6/2003 | Wyatt ................. A47J 36/2494 219/621 |
| 2003/0121907 A1 | | 7/2003 | Wyatt |
| 2006/0219712 A1 | | 10/2006 | Ramirez |
| 2007/0151563 A1 | | 8/2007 | Hiel et al. |
| 2007/0181563 A1 | | 8/2007 | Hiel et al. |
| 2008/0277400 A1 | | 11/2008 | Welsh et al. |
| 2009/0078125 A1 | | 3/2009 | Pawlick et al. |
| 2009/0188909 A1 | * | 7/2009 | Jones .................... A47J 27/002 219/621 |
| 2010/0294753 A1 | * | 11/2010 | Jones .................... A47J 27/002 219/621 |
| 2012/0037615 A1 | * | 2/2012 | Hafner .................... A47J 36/02 219/647 |
| 2013/0101721 A1 | | 4/2013 | Crocker et al. |
| 2014/0042172 A1 | * | 2/2014 | McNaul .............. A47G 23/0313 220/574.2 |

OTHER PUBLICATIONS

Shore A Hardness Scale retrieved from: http://web.archive.org/web/20140424192457/http://apstpe.com/media/pdf/Shore-Hardness-Scales.pdf (Year: 2014).*

Zhi Li, et al., "Aramid fibers reinforced silical aerogel composites with low thermal conductivity and improved mechanical performance" Composites: Part A 84 (2016) 316-325 (Year: 2016).*

Sabic, Noryl TM Resin APS430 Retrieved from:https://http://www.matweb.com/search/datasheet.aspx?matguid=8b59def2e3f94d63b7360f9a0ccdd82f&ckck=1 (Year: 2020).*

Sabic, Noryl TM resin GTX810A data sheet retrieved from: https://omnexus.specialchem.com/product/t-sabic-noryl-gtx810a (2020) (Year: 2020).*

Standard Test Method for Distortion Temperature in Three-Point Bending by Thermomechanical Analysis, Sep. 1, 2009; pp. 1-5, ASTM International Designation: E2092-09.

* cited by examiner

INDUCTION-BASED HEAT RETENTIVE SERVER

CROSS-REFERENCE TO RELATED APPLICATIONS

This application is a continuation of U.S. patent application Ser. No. 13/934,509, filed Jul. 3, 2013, which is a division of U.S. patent application Ser. No. 13/280,068, filed Oct. 24, 2011.

BACKGROUND

The present invention relates to heat retentive servers and, more particularly, to heat retentive servers that are heated by induction.

When food is cooked and then served to remotely located consumers, such as in hotels, aircraft and institutional settings (e.g., hospitals and nursing homes), there is often a delay between the cooked food being placed on a plate or other dish, and the food being provided to the consumer for consumption. Therefore, the food may become cold by the time it is provided to the consumer, unless steps are taken to keep the food warm.

It is known to keep food warm in such circumstances by serving it on a food-carrying dish, such as a plate, that is upon a warm or hot heat retentive server (e.g., serving tray), and some of such servers are configured for being heated by electromagnetic induction. The plate and food may be covered with an insulated, dome-shaped cover having a lower periphery that substantially seals against an upper periphery of the heat retentive server. The heat retentive server, plate and cover may collectively be referred to as a "pellet system." Such induction-based heat retentive servers or pellet systems have long been recognized as an excellent choice for keeping food warm.

When using such a pellet system for providing food at a serving temperature of 140° F. or higher after one hour, it is conventional for a plate that has been washed to thereafter be preheated to at least 165° F. in a dish heater, and then for the food at a temperature of 165° F. to be placed on the preheated plate prior to placing the plate on the induction-based heat retentive server. It can be disadvantageous to preheat numerous plates, because doing so requires space and energy. Having to preheat numerous plates may also be a safety hazard, since food service operators may get burned by touching the plate heaters in certain spots.

Thus, there is a need for induction-based heat retentive servers or pellet systems that overcome one or more of the disadvantages of known systems and/or otherwise provide a new balance of properties.

BRIEF SUMMARY

One aspect of this disclosure is the provision of a pellet system that may be used to transport and serve food so that the food has a serving temperature of 140° F. or higher after one hour, without preheating the dish of the pellet system. More specifically and in accordance with one embodiment, a method is provided for using a heat retentive server having an induction-heatable member enclosed within a body. The method may include induction heating the induction-heatable member to a temperature greater than the heat deflection temperature of the body while the induction-heatable member is enclosed within the body, placing a dish that is at about room temperature on the body while the induction-heatable member is enclosed in the body, and allowing heat transfer from the server to the dish to increase the temperature of the dish. The heat transfer from the server to the dish may be buffered by buffering material positioned between the induction-heatable member and the body. The food may be placed on the dish prior to placing the dish upon the body of the server. The method may further include washing the dish prior to the placing of the food on the dish, and not heating the dish (e.g., bypassing any dish heater) between the washing of the dish and the placing of the dish on the body of the server. The food and dish may be covered with an insulated cover while the food and dish are on the server. The server and the insulated cover may be cooperative for keeping the food at a temperature above 140° F. for one hour (e.g., for more than one hour).

In accordance with one aspect of this disclosure, the body of the heat retentive server has an inner chamber, and the induction-heatable member is positioned in the chamber. Thermal material is positioned in the chamber and envelopes (e.g., partially envelopes or fully envelopes) the induction-heatable member. The thermal material is adapted for providing predetermined conductive heat transfer from the induction-heatable member to the body so that the temperature of at least a portion of the body becomes greater than the heat deflection temperature of the body in response to the induction-heatable member being heated by electromagnetic induction to greater than the heat deflection temperature of the body. More specifically, the induction-heatable member may be heatable by electromagnetic induction to a first temperature that is greater than the heat deflection temperature of the body, and the thermal material may be adapted so that at least a portion of the body is heated to a second temperature that is greater than the heat deflection temperature of the body in response to the induction-heatable member being heated by electromagnetic induction to the first temperature, wherein the second temperature is less than the first temperature. For example, the first temperature may be more than 81° F. hotter than the second temperature.

The induction-heatable member may comprise a metal plate, or more specifically a metal disk, and a porcelain enamel coating that partially or fully encloses the metal disk. The porcelain enamel coating advantageously seeks to cause uniform dissipation of heat from the metal disk, and also serves as a protective coating, such as for inhibiting any rusting.

In one embodiment, the body of the server comprises an upper shell and a lower shell, and the body's chamber is defined between the upper and lower shells. The thermal material that is positioned in the chamber and envelopes (e.g., partially envelopes or fully envelopes) the induction-heatable member may include insulation and buffering material comprising an inhibitively conductive hydrophobic material. In one embodiment, the buffering material is positioned in the chamber between the induction-heatable member and the upper shell, and the buffering material is adapted for providing predetermined conductive heat transfer from the induction-heatable member to the upper shell so that the temperature of at least a portion of the upper shell becomes greater than the heat deflection temperature of the upper shell in response to the induction-heatable member being heated by electromagnetic induction to a temperature greater than the heat deflection temperature of the upper shell. More specifically, the induction-heatable member may be heatable by electromagnetic induction to a temperature (e.g., a relatively high temperature) that is greater than the heat deflection temperature of the upper shell, and the buffering material may be adapted for providing predetermined conductive heat transfer from the induction-heatable member to the upper shell so that at least a portion of the upper shell is heated to a temperature (e.g., a relatively low temperature as compared to the relatively high temperature of the induction-heatable member) that is greater than the heat deflection temperature of the upper shell.

In contrast, the insulation may be positioned in the chamber between the induction-heatable member and the lower shell, and the insulation may be adapted for restricting conductive heat transfer from the induction-heatable member to the lower shell so that the temperature of the lower shell does not exceed the heat deflection temperature of the lower shell in response to the induction-heatable member being heated by electromagnetic induction to the temperature greater than the heat deflection temperature of the upper shell. The heat deflection temperature of the upper shell may be substantially equal to the heat deflection temperature of the lower shell.

The foregoing presents a simplified summary of some aspects of this disclosure in order to provide a basic understanding. The foregoing is not an extensive summary and is not intended to identify key or critical elements of the invention or to delineate the scope of the invention. The purpose of the foregoing summary is to present some concepts of this disclosure in a simplified form as a prelude to the more detailed description that is presented later. For example, other aspects of this disclosure will become apparent from the following.

BRIEF DESCRIPTION OF THE DRAWINGS

Having described some aspects of this disclosure in general terms, reference will now be made to the accompanying drawings, which are not necessarily drawn to scale and may be partially schematic. The drawings are exemplary only, and should not be construed as limiting the invention.

FIG. 2 is a cross-sectional view taken along line 2-2 of FIG. 1, wherein line 2-2 intersects and is perpendicular to a central axis of the server, and wherein FIG. 2 is representative of all cross-sections taken along lines that intersect and extend perpendicularly to the central axis of the server, in accordance with the first embodiment.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention.

Figure 1:
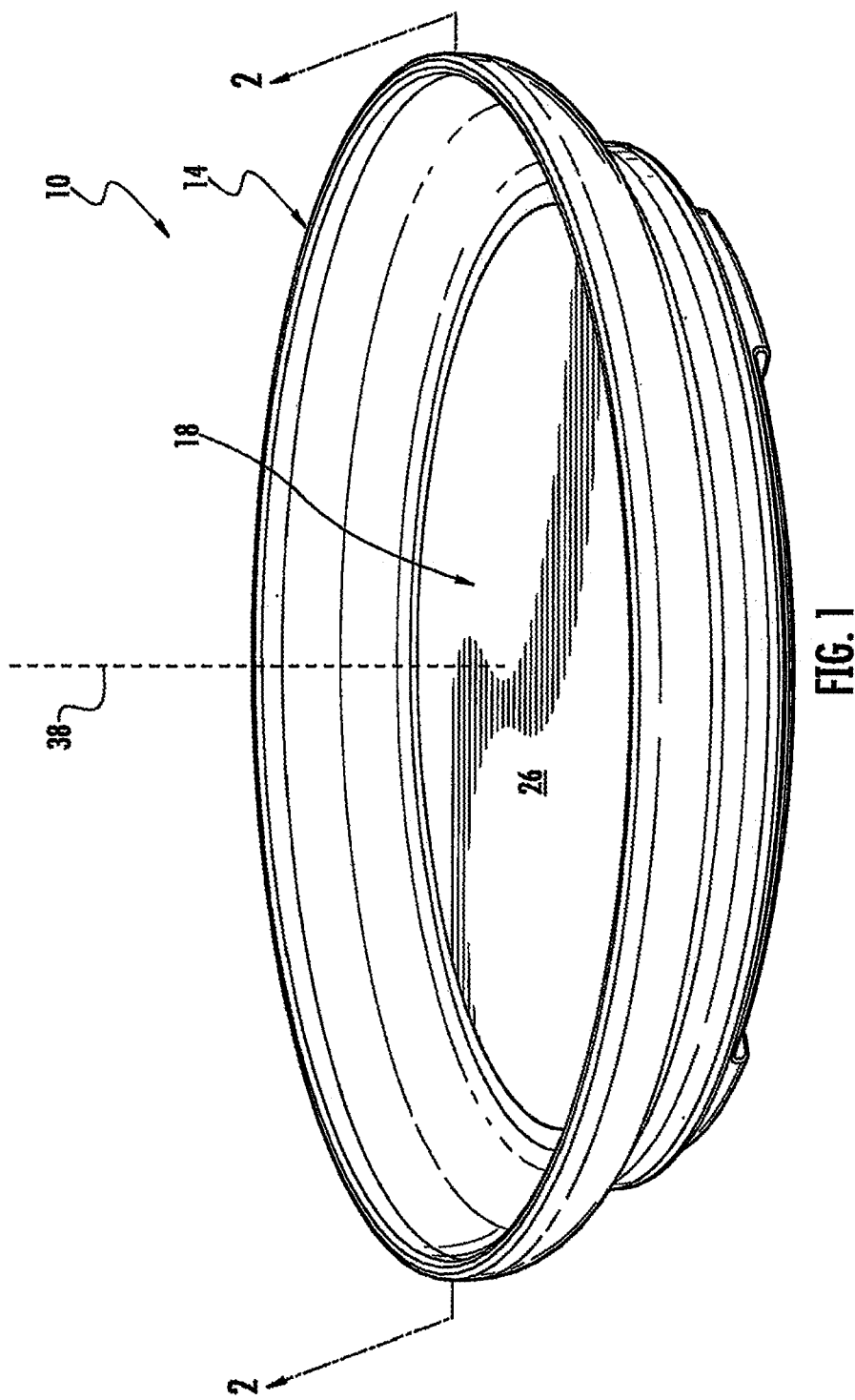
FIG. 1 is a top perspective view of a heat retentive server, in accordance with a first embodiment of this disclosure.
Figure 2:
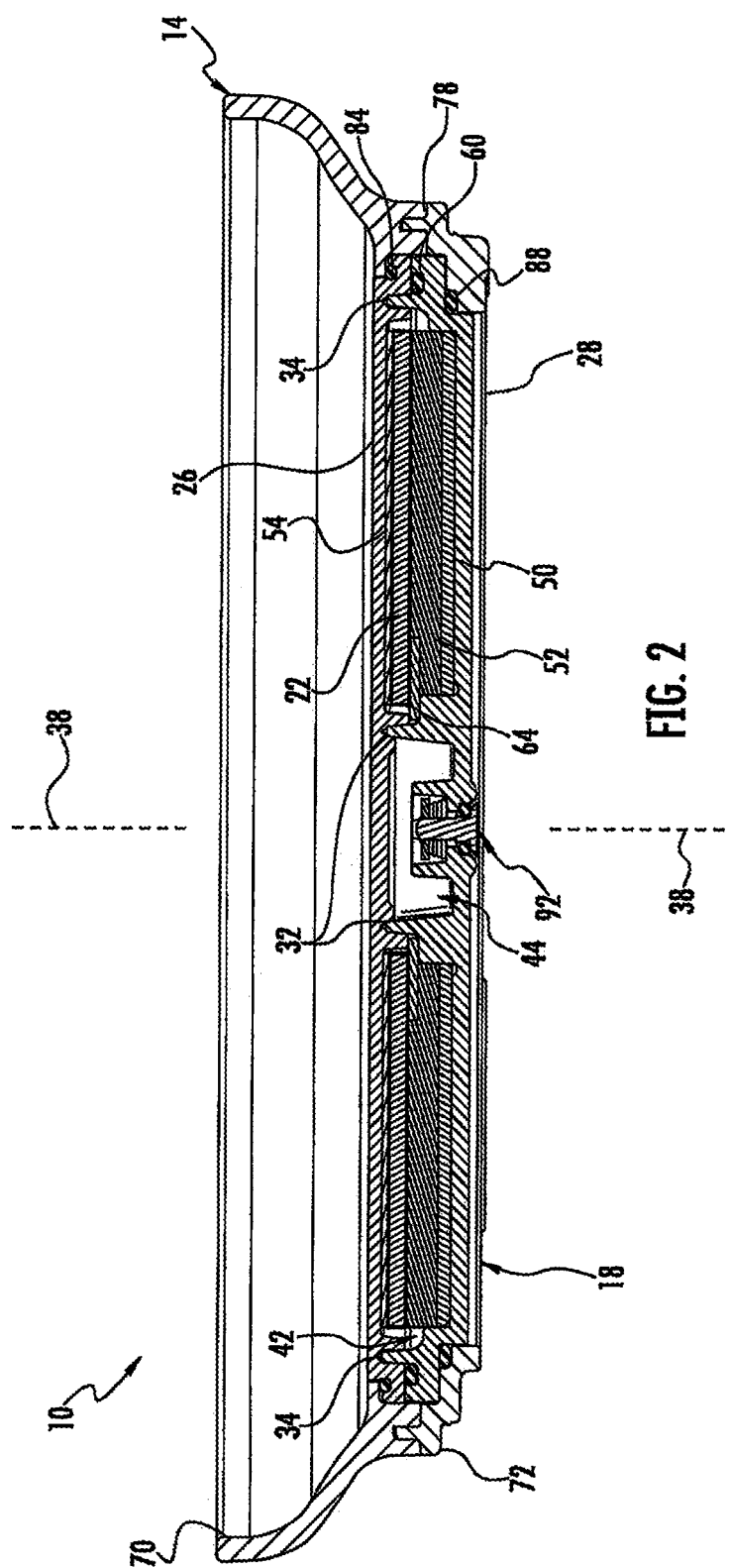

Referring to FIGS. 1 and 2, a heat retentive server 10 of a first embodiment of this disclosure is described in the following. The server 10 includes an upwardly and outwardly extending polymeric ring 14 mounted to a periphery of a central disk assembly 18, so that the server may be characterized as being in the form of a round tray or plate-like structure, although numerous other configurations are within the scope of this disclosure, as will be discussed below. Referring also to FIG. 2 and as discussed in greater detail below, at least one internal metallic plate, or more specifically a metallic disk 22, of the disk assembly 18 may be heated by way of electromagnetic induction while the server 10 is upon an activator 5 containing one or more induction coils (not shown). Thereafter, or at any other suitable time, a dish, such as a plate 6, may be placed centrally upon the upper surface of the disk assembly 18 so that the ring 14 extends around at least a lower portion of the plate. The dish, or more specifically the plate 6, may be made of china or other acceptable materials. The plate 6, as well as food 7 on the plate, may be covered with an insulated, dome-shaped cover 8 having a lower periphery that substantially seals against an upper periphery of the ring 14. Typically the plate 6 and food 7 are covered with the insulated cover 8 from shortly after the point in time at which the plate with food is placed upon the server 10 to shortly before the point in time at which the food is to be consumed. Examples of covers, or lids, are disclosed in U.S. Pat. Nos. 4,982,722, 5,603,858 and 6,670,589, and the disclosure of each of these patents is incorporated herein by reference in its entirety. As an example of an advantage that will be discussed in greater detail below, the washed dish 6 may not need to be preheated prior to placing the food 7 thereon, because the server 10 may provide sufficient heat energy so that the food 7 may have a serving temperature of at least 140° F. after one hour irrespective of whether the dish is preheated or at room temperature when the food is placed thereon.

Referring in greater detail to FIGS. 1 and 2, the disk assembly 18 includes a body that is typically in the form of polymeric upper and lower shells 26, 28 that are fixedly connected to one another. The shells 26, 28 may be connected in any suitable manner. For example, the ring 14 is typically mounted to the periphery of the disk assembly 18 in a manner that at least partially holds (e.g., clasps) the shells 26, 28 together, as will be discussed in greater detail below. In the first embodiment, the upper and lower shells 26, 28 are also fixedly mounted to one another at annular inner and outer joints 32, 34, wherein the inner and outer joints 32, 34, like many other features of the server 10, extend around and are coaxially arranged with respect to a central axis 38 of the server.

For each of the inner and outer joints 32, 34, the upper shell 26 defines a downwardly oriented annular receptacle that is in snug receipt of an upwardly oriented annular protrusion of the lower shell 28. Prior to mounting the shells 26, 28 together, the downwardly oriented annular receptacles of the upper shell 26 would be downwardly open, since they would not yet be in respective receipt of the upwardly oriented annular protrusions of the lower shell 28. Each of the downwardly oriented annular receptacles of the upper shell 26 is defined between a pair of downwardly extending, concentric portions of the upper shell.

For each of the inner and outer joints 32, 34, there may be an annular interference fit between the annular receptacle of the upper shell 26 and the annular protrusion of the lower shell 28. In addition and/or alternatively, for each of the inner and outer joints 32, 34, there may be an annular connection (e.g., a sonic weld) between at least the tip of the annular protrusion and the apex of the annular receptacle of the joint. For each of the inner and outer joints 32, 34, the positions of the annular receptacle and annular protrusion of the joint may be reversed. The upper and lower shells 26, 28 may be connected to one another in any other suitable manner.

The disk assembly 18 includes an outer chamber 42 that extends around an inner chamber 44 of the disk assembly. The chambers 42, 44 are defined between the upper and lower shells 26, 28, so that the inner chamber 44 is circumscribed by the inner joint 32, the outer chamber 42 circumscribes the inner joint, and the outer joint 34 circumscribes the outer chamber. The induction-heatable metallic disk 22 is positioned in the outer chamber 42. The inner joint 32 extends through a central hole in the metallic disk 22.

The metallic disc 22 is enveloped (e.g., partially enveloped or fully enveloped) by thermal material that is within the outer chamber 42. In the first embodiment, the thermal material is layered, so that there are layers 50, 52, 54 of thermal material (e.g., plies 50, 52 of insulating material and a ply of buffering material 54) that are in a stacked configuration, wherein each of the layers 50, 52, 54 is in the form of a disk with a central hole through which the inner joint 32 extends, and the metallic disk 22 is positioned within the stack of layers 50, 52, 54.

The layers 50, 52, 54 of thermal material are adapted for both retaining heat in the metallic disk 22, and directing heat from the metallic disk to the plate 6, or other object(s), that are upon the upper surface of the upper shell 26. More specifically and regarding the conductive flow of heat from the heated metallic disk 22 in an axial direction that extends along and parallel to the central axis 38 of the server 10, the rate of conductive heat flow (e.g., heat flux) through the upper layer 54 of buffering material and the upper shell 26 exceeds the rate of conductive heat flow (e.g., heat flux) through the lower and intermediate layers 50, 52 of insulation and the lower shell 28.

More specifically and in accordance with the first embodiment, outward heat transfer through the lower shell 28 is not desired, and such outward heat transfer through the lower shell may be characterized as being heat loss to the system. Also, it is typically desirable for the lower shell 28 not to be hot to the touch so as not to cause a burn injury when the metallic disk 22 is hot. Accordingly, the lower and intermediate layers 50, 52 of insulation are adapted for substantially restricting outward heat transfer through the lower shell 28.

In contrast, controlled, long-term, substantial outward heat transfer through the upper shell 26 is desired. Accordingly, the layer 54 of buffering material serves as a buffer between the metallic disk 22 and the upper shell 26. In the first embodiment, the layer 54 of buffering material fills the gap between the metallic disk 22 and the upper shell 26, and the layer of buffering material is adapted for gradually transferring heat from the metallic disk to the upper shell, wherein the heat transfer through the layer of buffering material is slow and gradual so that, while the metallic disk is sufficiently hot, the temperature of the under side of the upper shell can exceed the heat deflection temperature of the material from which the upper shell is constructed, without damaging the upper shell.

In the first embodiment and as will be discussed in greater detail below, the disk assembly 18 may be configured (e.g., the layers 50, 52, 54 are adapted) for providing predetermined conductive heat transfer from the metallic disk 22 to the body (i.e., the upper and lower shells 26, 28) of the disk assembly, so that, in response to the metallic disk being heated by electromagnetic induction to greater than the heat deflection temperature of the body: the temperature of at least a portion of the body, namely at least a portion of the upper shell 26 (e.g., the portion(s) of the upper shell that are in relatively close proximity to the layer 54 of buffering material) become(s) greater than the heat deflection temperature of the body; and in contrast the temperature of at least a portion of the body, namely the lower shell 28, does not exceed the heat deflection temperature of the body. Other configurations are also within the scope of this disclosure.

As mentioned above, the metallic disk 22 may be heated by electromagnetic induction, and the disk assembly 18 is adapted so that there is predetermined conductive heat transfer from the heated metallic disk, through the layers 50, 52, 54, and through the shells 26, 28. In this regard, the disk assembly 18 of the first embodiment includes different features that are cooperative for providing the predetermined conductive heat transfer, and the cooperative features generally include the selection and arrangement of the layers 50, 52, 54, which will be discussed in greater detail below, as well as provisions made in an effort to exclude, or minimize, any water in the heat conductive paths defined by the disk assembly. For example, each of the lower and intermediate layers 50, 52 of insulation may be impregnated with synthetic amorphous silica to produce a hydrophobic affect, as will be discussed in greater detail below. In this regard, when the servers 10 are used in conjunction with serving food 7, it is typical for the servers to be washed with soap and water, or the like, after each use; therefore, the servers may be repeatedly wetted and/or immersed in water.

In accordance with the first embodiment, at least some of the adjacent structures in the disk assembly 18 are in opposing face-to-face contact with one another in a manner that inhibits any water from becoming intervened in at least some of the heat conductive paths that extend in the axial direction of the disk assembly. More specifically, a broad, substantially planar, annular, lower face of the lower layer 50 of insulation is substantially parallel to and in opposing face-to-face contact with a broad, substantially planar, annular, upper face of the lower shell 28. Similarly, a broad, substantially planar, annular, upper face of the upper layer 54 of buffering material is substantially parallel to and in opposing face-to-face contact with a broad, substantially planar, annular, lower face of the upper shell 26.

The metallic disk 22 is positioned between the lower and upper layers 50, 54. More specifically, the metallic disk 22 is positioned between the intermediate and upper and layers 52, 54. A broad, substantially planar, annular, upper face of the intermediate layer 52 of insulation is substantially parallel to and in opposing face-to-face contact with a broad, substantially planar, annular, lower face of the metallic disk 22. Similarly, a broad, substantially planar, annular, lower face of the upper layer 54 of buffering material is substantially parallel to and in opposing face-to-face contact with a broad, substantially planar, annular, upper face of the metallic disk 22. A broad, substantially planar, annular, lower face of the intermediate layer 52 of insulation is substantially parallel to and in opposing face-to-face contact with a broad, substantially planar, annular, upper face of the lower layer 50 of insulation. The stack, which includes the metallic disk 22 and the layers 50, 52, 54, may be arranged differently. For example, the lower and intermediate layers 50, 52 of insulation may be replaced with a single layer of insulation, or any other suitable arrangement of the insulation may be utilized.

In accordance with the first embodiment, the primary heat conductive paths defined by the disk assembly 18 are associated with the outer chamber 42, since the metallic disk 22 is therein; therefore, the outer chamber is sealed in a manner that seeks to prevent water from entering the outer chamber. In this regard, the seal present at each of the inner and outer joints 32, 34 may be enhanced by and/or at least partially provided by a gasket, or any other suitable sealing feature, in any suitable configuration. More specifically, an intermediate o-ring 60 is adjacent the outer joint 34, and an annular washer 64 is adjacent the inner joint 32. As a more specific example, the intermediate o-ring 60 is housed in an annular channel of the lower shell 28, and the intermediate o-ring is compressed between an annular lower wall of the lower shell's channel and an annular lower surface of the upper shell 26. As another specific example, an annular inner portion of the washer 64 is compressed between an annular, upwardly facing shoulder of the lower shell 28 and a downwardly oriented annular protrusion of the upper shell 26. Upper and lower surfaces of an annular outer portion of the washer 64 are respectively in opposing face-to-face contact with an annular inner portion of the lower face of the metallic disk 22 and an annular inner portion of the upper face of the intermediate layer 52 of insulation.

As alluded to above, the inner portion of the ring 14 may be characterized as being in the form of a permanently closed, annular clasp that is fixedly mounted onto the outer, annular, peripheral edges of the shells 26, 28 in a manner that holds the shells tightly together. The ring 14 and/or the ring's clasping feature may be omitted, or provided in any suitable manner. In the first embodiment, the ring 14 includes an upper ring portion 70 and a lower ring portion 72, and the ring's annular clasping feature is provided by fixedly joining together the upper and lower ring portions 70, 72 so that outwardly extending annular flanges of the shells 26, 28 are pinched between inwardly extending annular flanges of the upper and lower ring portions 70, 72.

The upper and lower ring portions 70, 72 may be joined together in any suitable manner, such as at an annular connection 78 between a lower annular surface of the upper ring portion 70 and an upper annular surface of the lower ring portion 72. The annular connection 78 between the upper and lower ring portions 70, 72 may be formed in any suitable manner. For example, the annular connection 78 between the upper and lower ring portions 70, 72 may be formed in a leakproof manner by plastic welding, fusing or heat sealing the respective annular surfaces of the upper and lower ring portions together. Suitable methods and apparatus for forming the annular connection 78 between the respective annular surfaces of the upper and lower ring portions 70, 72 may be available from Emabond Solutions of Norwood, N.J.

Seals between the outwardly extending annular flanges of the shells 26, 28 and the inwardly extending annular flanges of the ring portions 70, 72 may be enhanced by and/or at least partially provided by gaskets, or any other suitable sealing features, in any suitable configuration. More specifically, an upper o-ring 84 is positioned in an annular channel defined in the outwardly extending annular flange of the upper shell 26, and the upper o-ring is compressed between an annular lower wall of the upper shell's channel and an annular lower surface of the inwardly extending annular flange of the upper ring portion 70. Somewhat similarly, a lower o-ring 88 is positioned in an annular channel defined in the inwardly extending annular flange of the lower ring portion 72, and the lower o-ring is compressed between an annular lower wall of the lower ring portion's channel and an annular lower surface of the outwardly extending annular flange of the lower shell 28.

Optionally, the lower shell 28 defines a central opening to the inner chamber 44, and a spring-loaded pressure relief valve 92 is mounted to the lower shell for maintaining the central opening in a sealed closed configuration, except that the pressure relief valve is operative for temporarily opening the central opening and thereby venting the inner chamber in response a predetermined differential pressure between the ambient environment and the atmosphere in the inner chamber. More specifically, the opening to the inner chamber 44 may be at least partially defined by, or associated with, a valve seat, and a valve disk of the pressure relief valve 92 is typically urged and sealed against the valve seat by one or more springs. The valve disk may be temporarily pushed off of the valve seat, for venting the inner chamber 44, in response to any predetermined increase in pressure within the inner chamber, such as may occur in response to the metallic disk 22 being sufficiently heated. An o-ring or any other suitable structure for aiding in the sealing may be mounted to and carried by the valve disk, so that the spring-driven valve disk forces the o-ring, or any other suitable device, against the valve seat. Alternatively, any other suitable type of pressure relieving device may be used, such as, but not limited to, a "membrane" or diaphragm pressure relief valve. Examples of pressure relieving devices are disclosed in U.S. Pat. No. 6,005,233, and the disclosure of this patent is incorporated herein by reference in its entirety.

For the purpose of providing a more specific example, a second embodiment of this disclosure is described in the following, and the second embodiment is identical to the first embodiment, except for being described more specifically in the following; therefore, the same reference numerals are used. In accordance with the second embodiment:

the metallic disk 22 is a porcelain enamel coated metal disk, and more specifically the metallic disk is a carbon metal disk (the metal comprises carbon as an alloying element) with a porcelain enamel coating;

each of the upper and lower shells 26, 28 is constructed of a high temperature polymer material, more specifically each of the upper and lower shells is constructed of reinforced polymer material, and even more specifically each of the upper and lower shells is constructed of a blend of modified polyphenylene ether (PPE) and polyamide (PA) with 30% glass fill;

the lower layer 50 of insulation is 2 mm thick and impregnated with synthetic amorphous silica so that it is hydrophobic, more specifically the lower layer of insulation is a layer of silica aerogel that is 2 mm thick, and more specifically the lower layer of insulation is a 2 mm thick piece of silica aerogel nanoporous insulation;

the intermediate layer 52 of insulation is 5 mm thick and impregnated with synthetic amorphous silica so that it is hydrophobic, more specifically the intermediate layer of insulation is a layer of silica aerogel that is 5 mm thick, and more specifically the intermediate layer of insulation is a 5 mm thick piece of insulation formed of silica aerogel and reinforced with a non-woven, glass-fiber batting;

the upper layer 54 of buffering material is a high temperature silicone pad that is less than about 0.1 inches thick, more specifically the upper layer of buffering material is a high temperature silicone membrane that is 0.032 inches thick, and more specifically the upper layer of buffering material is a piece of high temperature Shore A silicone that is 0.032 inches thick;

each of the o-rings 60, 84, 88 may be a nitrile o-ring, or an o-ring constructed of any other suitable material;

the washer 64 is a high temperature silicone washer, more specifically the washer is a high temperature silicone ring that is flat and 0.064 inches thick, and more specifically the washer is a flat piece of high temperature Shore A silicone that is 0.064 inches thick; and each of the upper and lower ring portions 70, 72 of the ring 14 is Polypropylene.

Each of the dimensions specified above for the second embodiment may be approximate, such that each of the dimensions specified above for the second embodiment may be preceded by "about". Similarly, each of the dimensions specified above for the second embodiment may vary within a reasonably suitable range/by a reasonably suitable amount, which may be plus and/or minus 5%, plus and/or minus 10%, plus and/or minus 15%, plus and/or minus 20%, or any other suitable amount.

Reiterating from above, the metallic disk 22 may be in the form of a metal plate, or more specifically a metal disk, that is coated with porcelain enamel, so that the porcelain enamel coating at least partially encloses, and typically fully encloses, the metal disk. The porcelain enamel coating is schematically illustrated in FIG. 2 by the relatively thick line defining the periphery of the metallic disk 22. The porcelain enamel coating advantageously seeks to cause uniform dissipation of heat from the metallic disk 22, and also serves as a protective coating, such as for inhibiting rusting of the metal disk.

Partially reiterating from above and in accordance with one specific example of the second embodiment, each of the upper and lower shells 26, 28 is constructed of polymer material (e.g., a blend of modified polyphenylene ether (PPE) and polyamide (PA) with 30% glass fill) that has a heat deflection temperature of 464° F. when tested with a load of 264 psi. In use, the server 10 is typically not exposed to a load of 264 psi. In a first example of operation of a specific version of the server 10 of the second embodiment in which each of the upper and lower shells 26, 28 is constructed of polymer material (e.g., a blend of modified polyphenylene ether (PPE) and polyamide (PA) with 30% glass fill) having a heat deflection temperature of 464° F. when tested with a load of 264 psi, the porcelain enamel coated, carbon metal disk 22 reached a peak temperature of 665° F. in response to being inductively heated by the activator 5 (FIG. 3) for a period of twelve seconds, and the upper layer of buffering material 54 (in the form of pad of high temperature Shore A silicone having a thickness of 0.032 inches) had a momentary peak operating temperature of 600° F. in response to the heating of metal disk 22.

In a second example of operation of the above-described specific version of the server 10, the metal disk 22 reached a peak temperature of 630° F. at the end of being inductively heated by the activator 5 (FIG. 3); at a distance of 0.080 inches into the upper shell 26, the upper shell reached a maximum temperature of 492° F. (e.g., core temperature of the upper shell 26); and the buffering material 54 reached a temperature of 570° F. That is, the metal disk 22 was heated by electromagnetic induction to a first temperature (e.g., 630° F.) that is greater than the heat deflection temperature of the body (e.g., the heat deflection temperature of the upper shell 26), and at least a portion of the body (e.g., at least a portion of the upper shell 26) was heated by conduction by way of the buffering material 54 to a second temperature (e.g., 492° F.) that is greater than the heat deflection temperature of the body (e.g., the heat deflection temperature of the upper shell 26). The second temperature (e.g., 492° F.) is less than the first temperature (e.g., 630° F.) by 138° F., or more generally by about 138° F. In the second example, the metal disk 22 was at a temperature of 160° F. at the beginning of the heating cycle, so that the second example simulates the server 10 being misused, since the metal disk may typically be at ambient temperature at the beginning of a heating cycle.

In each of the first and second examples presented above, the values may be considered to be approximate. The temperatures will vary because, for example, the performance of the servers 10 may vary slightly from server to server, and the performance of the activators 5 may vary slightly from activator to activator.

In accordance with a more general example of the second embodiment, the buffering material 54 is adapted for providing predetermined conductive heat transfer from the metallic disk 22 to the upper shell 26 so that the temperature of at least a portion of the upper shell becomes greater than the heat deflection temperature of the upper shell in response to the metal disk being heated by the activator 5/electromagnetic induction to a temperature greater than the heat deflection temperature of the upper shell. As a more specific example, the heat deflection temperature of the upper shell 26 may be about 464° F. when tested with a load of 264 psi, the server 10 uniformly/as a whole may be at about ambient room temperature (e.g., about 75° F.) prior to being inductively heated by the activator 5, the metal disk 22 may reach a peak temperature in a range of from about 580° F. to about 665° F. in response to being inductively heated by the activator 5, and a portion of the upper shell 26 may reach a peak temperature in a range of from about 460° F. to about 525° F. in response to conductive heat flow (e.g., heat flux) from the metal disk 22, through the layer 54 of buffering material, to the upper shell 26. As a more general example, the heat deflection temperature of a portion of the upper shell 26 may be from about 417° F. to about 511° F., the server 10 uniformly/as a whole may be at about ambient temperature (e.g., about 75° F.) to about 100° F. prior to being inductively heated by the activator 5, the metal disk 22 may reach a peak temperature in a range of from about 522° F. to about 700° F. in response to being inductively heated by the activator 5, and a portion of the upper shell 26 may reach a peak temperature in a range of from about 414° F. to about 576° F. in response to conductive heat flow (e.g., heat flux) from the metal disk 22, through the layer 54 of buffering material, to the upper shell 26. When the server 10 is operated as discussed above, the peak temperature of the upper shell 26, which is above the heat deflection temperature of the upper shell, may be up to about 280° F. less than the peak temperature the metal disk 22; or the peak temperature of the upper shell 26, which is above the heat deflection temperature of the upper shell, may be less than the peak temperature the metal disk 22 in a range of from about 55° F. to about 205° F., in a range of from about 108° F. to about 156° F., or a range of from about 120° F. to about 140° F. When the server 10 is operated as discussed above, the peak temperature of the metal disk 22 may be more than 81° F., 108° F., 120° F., 140° F., 156° F. or 205° F. hotter than the peak temperature of the upper shell 26 and/or the peak temperature of the metal disk 22 may be up to about 310° F. hotter than the peak temperature of the upper shell 26.

Figure 3:
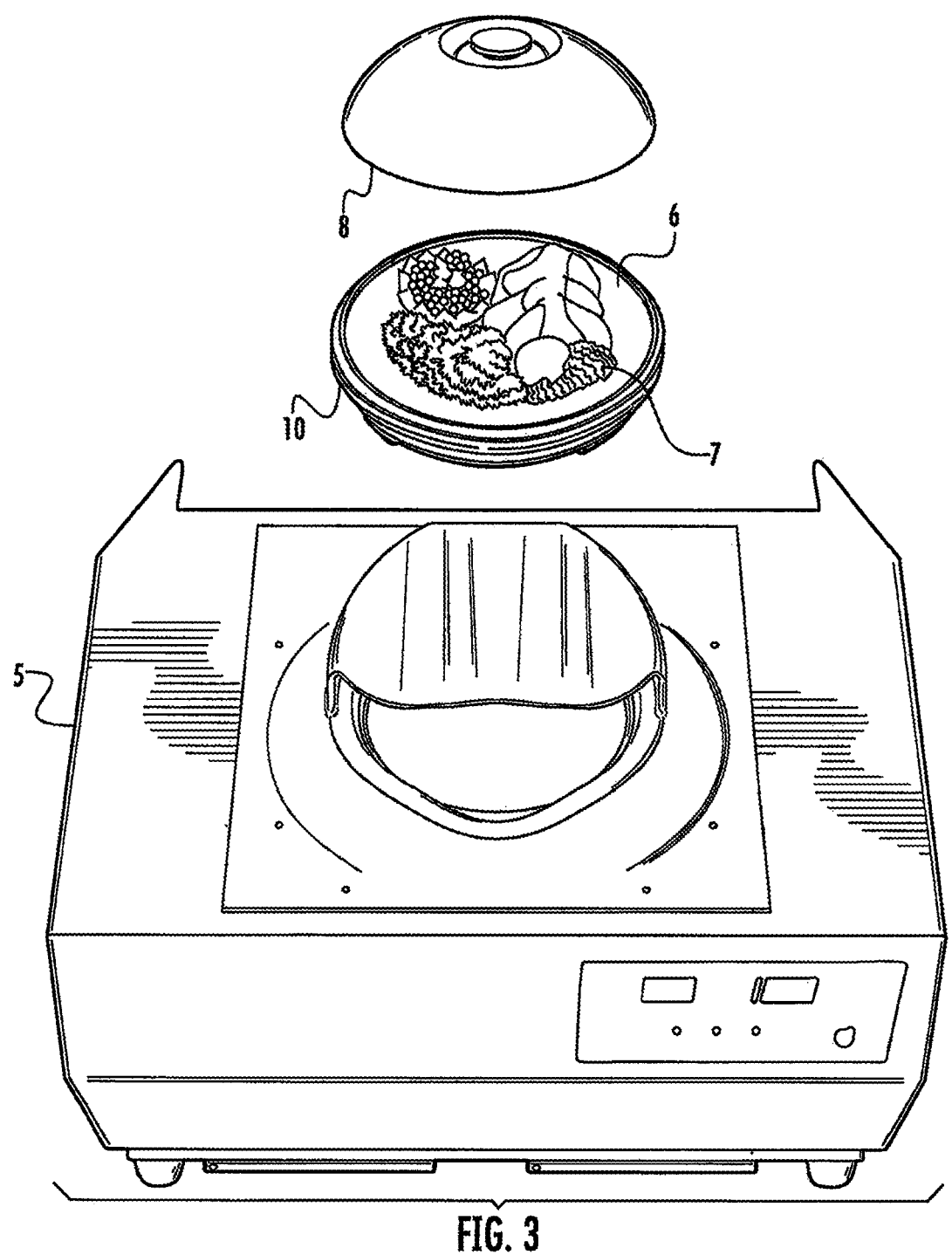
FIG. 3 is a partially exploded view showing the server exploded away from an activator, and an insulated cover exploded away from the server and a plate carried by the server, in accordance with the first embodiment.

In an exemplary method of using the server 10, the metal disk 22 is heated by the activator 5 to greater than the heat deflection temperature of the shells 26, 28, and then the dish 6 (FIG. 3), which is at about ambient room temperature (e.g., about 75° F.) is placed on the server 10 as shown in FIG. 3. The food 7 (FIG. 3) may be placed on the dish 6 at any suitable time, such as prior to the dish being placed upon the server 10. For example, the food 7 may weigh about twelve to fifteen ounces, and may be at about 165° F. when it is placed on the dish. The dish 6 with the food 7 thereon may be quickly placed upon the server 10, so that the dish is only slightly heated by the food prior to the dish being placed on the server. Accordingly, the dish 6 may be referred to as being at about ambient room temperature after the dish is slightly heated by the food 7. The server 10 may provide sufficient heat energy to heat the dish and the food so that the food is above about 140° F. after an hour of sitting on the dish that is sitting upon the server 10. That is, in the exemplary method of this disclosure, the washed dish 6 does not have to be preheated prior to placing the food 7 thereon, because the server 10 provides sufficient heat energy to provide the desired result without preheating the dish, wherein the desired result comprises the food having a serving temperature of at least 140° F. after one hour. That is and in accordance with one aspect of this disclosure, the server 10 is constructed to control the direction and rate of heat transfer to facilitate the exemplary method of this disclosure. As mentioned above, typically the dish 6 and food 7 are covered with the insulated cover 8 from shortly after the point in time at which the dish with food is placed upon the server 10 to shortly before the point in time at which the food is to be consumed. Accordingly, the insulated cover 8 and the server 10 may be cooperative for providing the above-discussed functionalities.

In contrast to the exemplary method of this disclosure, it is conventional for a dish that has been washed to thereafter be preheated to at least 165° F. in a dish heater, and then for the food at a temperature of at 165° F. to be placed on the preheated dish prior to placing the dish on an induction-based heat retentive server. It can be disadvantageous to preheat numerous dishes, because doing so requires space and energy. Having to preheat numerous dishes may also be a safety hazard, since food service operators may get burned by touching the dish heaters in certain spots.

In the exemplary method of this disclosure, any conventional dish heater (not shown) that is proximate the system of this disclosure may be bypassed (e.g., the dish 6 is not heated) between the washing of the dish 6 in a conventional manner and the placing of the dish upon the server 10. Notwithstanding, this disclosure is not limited to requiring bypassing of any dish heater/the dish 6 may alternatively be heated by a dish heater prior to placing the dish upon the server 10.

The activator 5 (e.g., its induction coil(s) and generator(s)) are typically configured to be powerful enough to provide the values discussed above. For example, the activator 5 may included a guide or receptacle for receiving the server 10, and the activator may provide a power output of 10 kilowatts for twelve seconds while the server is properly positioned in the receptacle, so that the metallic disk 22 of the server is heated by way of electromagnetic induction. The activator 5 may provide the power output in response to the server 10 initially engaging an activation switch. The activation switch may be positioned in the receptacle so that the activation switch is engaged by the server 10 when the server is properly positioned in the receptacle. For cooling the electronics within the activator 5, the rear wall of the activator may be vented (e.g., louvered), and standoff structure(s) such as projections, brackets or any other suitable spacers may project from proximate the rear wall in a manner that seeks to prevent the vents in the rear wall from becoming obstructed. Any other suitable activator 5 may be used.

In the foregoing, examples are provided of features that are cooperative for providing predetermined conductive heat transfer. However, it may be possible to use a lesser number of the subject features and/or the subject feature(s) in different configurations to provide the predetermined conductive heat transfer, or the like; therefore, the provision of specific examples herein is not intended to limit the scope of this disclosure.

Whereas the disk assembly 18 and the ring 14 are often round in shape, they may be shaped differently, so that the server is oblong or in the shape of a quadrilateral, such as a parallelogram, or in any other suitable shape. In addition, the obliqueness and/or height of the ring 14 relative to the disk assembly 18 may vary, such as by the ring being more shallow and/or more upright, and the ring may be otherwise reduced in size or even omitted. As another example, one or more of the disk assemblies may be incorporated into a single tray.

The above examples are in no way intended to limit the scope of the present invention. It will be understood by those skilled in the art that while the present disclosure has been discussed above with reference to exemplary embodiments, various additions, modifications and changes can be made thereto without departing from the spirit and scope of the invention as set forth in the claims.

What is claimed is:

1. A heat retentive server comprising:
a body having a chamber, an upper shell and a lower shell that are connected to one another, the chamber being defined between the upper shell and the lower shell, the body having a heat deflection temperature;
an induction-heatable member positioned in the chamber, the induction-heatable member being heatable by electromagnetic induction to a first temperature that is greater than the heat deflection temperature of the body; and
a buffering material positioned between the induction-heatable member and the upper shell, the buffering material comprising an inhibitively conductive hydrophobic material and enveloping the induction-heatable member, the buffering material providing predetermined conductive heat transfer from the induction-heatable member to the body so that at least a portion of the body is heated to a second temperature that is greater than the heat deflection temperature of the body in response to the induction-heatable member being heated by electromagnetic induction to the first temperature, and the second temperature is less than the first temperature, the server configured to cooperate with an insulated cover covering a surface of the server with a dish and food placed upon the dish between the cover and the server to keep the food at a temperature above 140° F. for one hour after the food and the dish are covered with the food being at a temperature of about 165° F. when placed on the dish and the dish being about room temperature when placed on the server, the buffering material comprising:
upper buffering material positioned between the induction-heatable member and the upper shell, and
lower insulating material positioned between the induction-heatable member and the lower shell,
the upper buffering material being thinner than the lower insulating material.

2. The heat retentive server according to claim 1, wherein the induction-heatable member comprises a metal plate and a porcelain enamel coating that encloses the metal plate.

3. A heat retentive server system comprising:
the heat retentive server according to claim 1;
a dish; and
an insulated cover for covering the dish and food while the dish is upon the server and the food is upon the dish, the food weighing about 12 to about 14 ounces.

4. The heat retentive server according to claim 1, wherein the body is constructed of a blend of polyphenylene ether (PPE) and polyamide (PA), the heat deflection temperature of the body is in a range from about 417° F. to about 511° F.

5. The heat retentive server according to claim 1, wherein the body includes a 30% glass fill, the heat deflection temperature of the body is about 464° F. when tested with a load of 264 psi.

6. The heat retentive server according to claim 1, wherein the buffering material is in opposing face-to-face contact with both an upper surface of the induction-heatable member and a lower surface of the upper shell.

7. The heat retentive server according to claim 1, wherein the buffering material has a thickness of less than about 0.1 inches.

8. The heat retentive server according to claim 1, wherein the buffering material comprises silicone.

9. The heat retentive server according to claim 8, wherein the upper buffering material is high temperature Shore A silicone.

10. The heat retentive server according to claim 1, wherein the lower insulating material is impregnated with synthetic amorphous silica.

11. The heat retentive server according to claim 1, wherein the buffering material comprises intermediate insulating material positioned between the induction-heatable member and the lower insulating material.

12. The heat retentive server according to claim 11, wherein:
the lower insulating material comprises a layer of silica aerogel; and the intermediate insulating material comprises a layer of silica aerogel.

13. The heat retentive server according to claim 11, wherein:
the intermediate insulating material is thicker than the lower insulating material; and the intermediate insulating material comprises a reinforced layer of silica aerogel.

14. A heat retentive server comprising:
a body having a chamber, an upper shell, and a lower shell, the upper and lower shells connected to one another, the chamber being defined between the upper and lower shells;
an induction-heatable member positioned in the chamber, the induction-heatable member being heatable by electromagnetic induction; and
a buffering material positioned between the induction-heatable member and the upper shell, the buffering material configured to provide a predetermined conductive heat transfer from the induction-heatable member to the body such that the server is configured to cooperate with an insulated cover covering a surface of the server with a dish and food placed upon the dish between the cover and the server to keep the food at a temperature above 140° F. for one hour after the food and the dish are covered with the food being at a temperature of about 165° F. when placed on the dish and the dish being about room temperature when placed on the server, wherein
the buffering material comprises:
a lower buffering material positioned between the induction-heatable member and the lower shell;
an intermediate insulating material positioned between the induction-heatable member and the lower insulating material, the intermediate insulating material being thicker than the lower buffering material; and
an upper buffering material positioned between the induction-heatable member and the upper shell, the upper buffering material being thinner than the lower insulating material.

15. The heat retentive server according to claim 14, wherein the induction-heatable member is heatable to a first temperature that is greater than a heat deflection temperature of the body so that at least a portion of the body is heated to a second temperature that is greater than the heat deflection temperature of the body in response to the induction-heatable member being heated by electromagnetic induction to the first temperature, the second temperature being less than the first temperature.

16. The heat retentive server according to claim 14, wherein the buffering material at least partially envelops the induction-heatable member.

17. The heat retentive server according to claim 14, wherein the buffering material comprises silicone.

18. A server system comprising:
a dish;
a heat retentive server comprising:
a body having a chamber, an upper shell, and a lower shell, the upper and lower shells connected to one another, the chamber being defined between the upper and lower shells;
an induction-heatable member positioned in the chamber, the induction-heatable member being heatable by electromagnetic induction; and
a buffering material positioned between the induction-heatable member and the upper shell, the buffering material comprising an inhibitively conductive hydrophobic material, the buffering material providing predetermined conductive heat transfer from the induction-heatable member to the body, the buffering material comprising:
lower insulating material positioned between the induction-heatable member and the lower shell; and
upper buffering material positioned between the induction-heatable member and the upper shell, the upper buffering material being thinner than the lower insulating material; and
an insulated cover configured to cover the dish with food placed upon the dish and the dish placed upon the server, the server and the insulated cover configured to cooperate to keep the food at a temperature above 140° F. for one hour after the food and the dish on the server are covered with the insulated cover, the food being at a temperature of about 165° F. when placed on the dish and the dish being at about room temperature when placed on the server.

* * * * *